United States Patent [19]
Tsay et al.

[11] Patent Number: 6,148,838
[45] Date of Patent: Nov. 21, 2000

[54] AUTOMATED PROCESSING LIQUID DRAIN SYSTEM

[75] Inventors: Jyh-Yeong Tsay; Yung-Cheng Chen, both of Hsinchu, Taiwan

[73] Assignee: Vanguard International Semiconductor Corporation, Hsin Chu, Taiwan

[21] Appl. No.: 09/086,049

[22] Filed: May 28, 1997

[51] Int. Cl.[7] .............................. F16K 31/02; F16K 31/12
[52] U.S. Cl. .............................. 137/2; 137/391; 137/392; 137/395; 137/558; 141/192; 222/1; 222/23; 222/64; 340/620
[58] Field of Search .................................... 137/392, 395, 137/391, 2, 558; 141/192; 222/14, 21, 22, 56, 64, 1, 23; 340/620

[56] References Cited

U.S. PATENT DOCUMENTS

| | | | |
|---|---|---|---|
| 2,711,750 | 6/1955 | Norcross | 137/392 |
| 3,891,123 | 6/1975 | Blackburn | 222/64 |
| 4,042,444 | 8/1977 | Snyder | 137/391 |
| 4,226,267 | 10/1980 | Meacham et al. | 222/56 |
| 4,252,139 | 2/1981 | Davis et al. | 222/64 |
| 4,377,246 | 3/1983 | McMillin | 222/56 |
| 4,601,409 | 7/1986 | DiRegolo | 222/56 |
| 5,090,594 | 2/1992 | Randall, Jr. et al. | 222/64 |

*Primary Examiner*—George L. Walton
*Attorney, Agent, or Firm*—Tung & Associates

[57] ABSTRACT

The present invention discloses an automated processing liquid drain system that utilizes a series of processing liquid drain tanks and at least two waste collection tanks that are in fluid communication with the processing liquid drain tanks such that when a high liquid level sensor mounted on the drain tank is activated, the spent processing liquid collected from processing machines can be transferred to one of the waste collection tanks and thus preventing overflow in the processing liquid drain tanks.

20 Claims, 6 Drawing Sheets

AUTOMATED PROCESSING LIQUID DRAIN SYSTEM

FIELD OF THE INVENTION

The present invention generally relates to a processing liquid drain system and more particularly, relates to an automated processing liquid drain system that utilizes a series of processing liquid drain tanks and at least two waste collection tanks in fluid communication with the processing liquid drain tanks such that when a high liquid level sensor mounted on the processing liquid drain tank is activated, the spent processing liquid is transferred to one of the waste collection tanks for preventing overflow in the processing liquid drain tank.

BACKGROUND OF THE INVENTION

In the fabrication process for semiconductor chips, a large variety of liquid chemicals are utilized in a large number of manufacturing steps required for processing an IC chip. For instance, during the fabrication of a semiconductor chip, a semi-conducting substrate such as a silicon wafer must be processed in a multiplicity of fabrication steps. These steps may amount to as high as several hundred processing steps which include etching, cleaning, deposition, or any other necessary steps for fabrication. During these manufacturing steps, a variety of chemicals including liquids and gases must be used to, for instance, etch a specific design feature on a silicon wafer, to clean after each etching or deposition steps, to deposit layers of dielectric or conductive materials on the substrate.

Since a large number of chemicals used in the semiconductor fabrication are toxic and/or corrosive, the handling or transportation of these chemicals must be dealt with extreme care and personal contact with these chemicals must be avoided as much as possible. Some of these chemicals are, for example, strong acids used in an etcher for forming a specific structure on a semiconductor wafer, or a photoresist liquid used in a photolithographic process for reproducing a pattern on a substrate. During most processing steps, the liquid chemical material is not completely consumed by the process and therefore, spent chemical liquids must be recycled or otherwise disposed.

One example that requires spent liquid chemical disposal in a semiconductor fabrication facility is the photoresist coating process. In a wafer fabrication plant, as many as 20 photoresist liquid coating machines are used to form photoresist layers for performing photolithographic processes. Each coating machine is equipped with a drain box for collecting spent photoresist liquid that was not coated on the wafer surface. These liquid drain boxes are monitored by a weight fencing device and are emptied manually when the drain box is full and an alarm is sounded to alert the machine operator to manually empty the drain box. This becomes a tedious and time consuming process which leads to a decrease in the machine yield. The conventional method of manually emptying the drain boxes therefore must be improved or eliminated.

It is therefore an object of the present invention to provide an automated processing liquid drain system that does not have the drawbacks or shortcomings of the conventional processing liquid drain tanks.

It is another object of the present invention to provide an automated processing liquid drain system that utilizes a buffer tank for accepting spent processing liquid from a machine drain box and then passing the liquid to a waste collection tank.

It is a further object of the present invention to provide an automated processing liquid drain system that utilizes a buffer tank for accepting spent processing liquid from a machine drain box which is equipped with a high liquid level sensor that prevents overflow in the buffer tank.

It is still another object of the present invention to provide an automated processing liquid drain system that utilizes a machine drain box, a buffer tank for accepting liquid from the drain box, and a multiple number of waste collection tanks for accepting liquid from the buffer tank and for switching over to an empty collection tank when the first collection tank is full.

It is still another object of the present invention to provide an automated processing liquid drain system that utilizes a machine drain box, a buffer tank and a multiple number of waste collection tanks controlled by a master controller which receives signals from liquid level sensors mounted on the buffer tanks and on the waste collection tanks.

It is yet another object of the present invention to provide an automated processing liquid drain system that utilizes a buffer tank for each process machine which is equipped with a high liquid level sensor and a low liquid level sensor for feeding signals to a master controller.

It is still another further object of the present invention to provide an automated process liquid drain system that utilizes logic circuits for controlling the switching between a multiple number of buffer tanks and a multiple number of waste collection tanks such that at least 16 process machines can be handled by the master controller.

It is yet another further object of the present invention to provide a method for draining spent processing liquid from a process machine by flowing a spent processing liquid from a machine drain box to a buffer tank equipped with level sensors and then to waste collection tanks monitored by liquid level sensors and a master controller for switching the spent process liquid to empty waste collection tanks upon the filling up of a first collection tank.

SUMMARY OF THE INVENTION

In accordance with the present invention, an automated processing liquid drain system is provided which consist of a machine drain box, a buffer tank for accepting spent processing liquid from the drain box, and a multiple number of waste collection tanks for accepting the spent liquid from the buffer tank for disposal.

In a preferred embodiment, a processing liquid drain system can be provided which includes a first processing liquid drain tank positioned in close proximity to a process machine for collecting spent processing liquid, and a second processing liquid drain tank in fluid communication with the first processing liquid drain tank by a first conveying means wherein the second processing liquid drain tank is equipped with at least one liquid level sensing device, and at least two waste collection tanks that are in fluid communication with the second processing liquid drain tank by a second conveying means for accepting a processing liquid from the second processing liquid drain tank when the at least one high liquid level sensing device is activated.

In an alternate embodiment, an automated processing drain system is provided which includes a first liquid holding tank positioned in close proximity to a process machine for collecting spent processing liquid from the machine, a second liquid holding tank that is in fluid communication with the first liquid holding tank and is equipped with a high liquid level sensor and a low liquid level sensor, a first pump that is in fluid communication with and positioned inbetween the first and the second liquid holding tanks, at least one waste collection tank in fluid communication with the second liquid holding tank, and a second pump that is in fluid communication with and positioned inbetween the second liquid holding tank and the at least one waste collection tank for delivering spent processing liquid from the second liquid holding tank to the at least one waste collection tank when a high liquid level in the second liquid collection tank is detected by the high liquid level sensor.

The present invention is further directed to a method for draining spent processing liquid from a process machine which can be carried out by the operating steps of first collecting spent processing liquid into a first holding tank that is positioned in close proximity to the process machine, then flowing the spent processing liquid from the first holding tank into a second holding tank positioned at a level lower than the first holding tank through a first conduit wherein the second holding tank is equipped with a high liquid level sensor, then connecting the second holding tank in fluid communication to at least one waste collection tank through a pump and a valve, and then flowing the spent processing liquid to the at least one waste collection tank through a second conduit when a high liquid level is detected by the high liquid level sensor.

BRIEF DESCRIPTION OF THE DRAWINGS

These and other objects, features and advantages of the present invention will become apparent from the following detailed description and the appended drawing in which.

DETAILED DESCRIPTION OF THE PREFERRED EMBODIMENT

The present invention provides an automated processing liquid drain system that utilizes a machine drain box, a buffer tank connected to the machine drain box and equipped with level sensors, and a multiple waste collection tanks for accepting spent processing liquid from the buffer tanks. The system is automatically controlled by a main controller and a number of sub-controllers such that a total number of at least 16 process machines can be controlled by the system at the same time.

Figure 1:
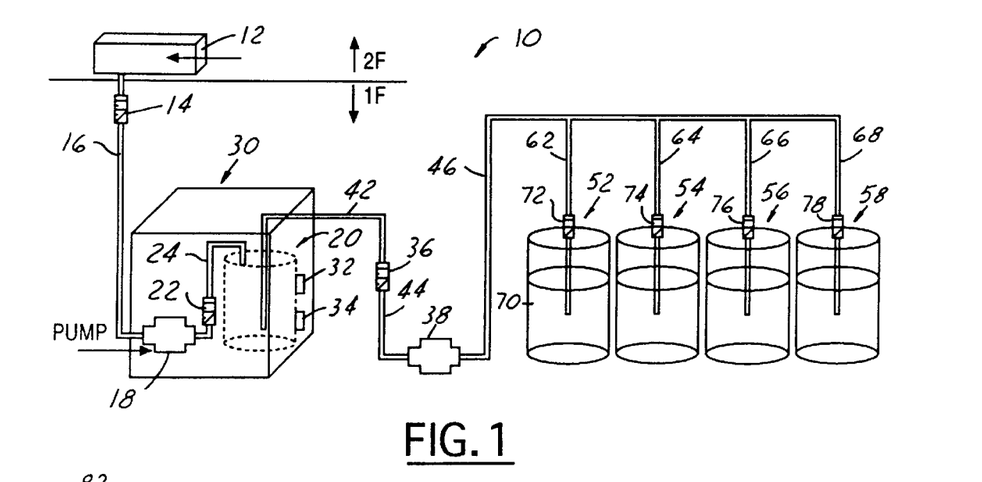
FIG. 1 is a perspective view of the present invention automated processing liquid drain system.

Referring initially to FIG. 1, wherein a perspective view of the present invention automated processing liquid drain system 10 is shown. In the system 10, a machine drain box 12 is first provided and positioned in close proximity to a process machine for collecting spent processing liquid. For instance, in a photoresist liquid coating machine, the spent or unused axis photoresist liquid is collected in a drain box located at the bottom of the machine. The drain box is then connected through a magnetic flow control valve 14 and conduit 16 to a pump 18. The pump 18 is normally in an on position when the photoresist coating machine is in operation such that the spent processing liquid in the drain box 12 is readily pumped away into a buffer, or a second processing liquid holding tank 20. The spent processing liquid is fed into the buffer tank 20 through flow control valves 22 and conduit 24. The buffer tank 20, the pump 18, the flow control valve 22 and the conduit 24 are normally contained in a drain box 30. The buffer tank 20 is equipped with at least two level sensors 32 and 34. The high liquid level sensor 32 and the low liquid level sensor 34 are mounted to the sidewall of the buffer tank 20 such that the liquid level inside the tank can be accurately read and controlled. The output signals from the high liquid level sensor 32 and the low liquid level sensor 34 are fed to a main controller (not shown).

A suitable liquid level sensor is a capacitance sensor that can be used to sense a liquid level in a limited space available. These type of sensors can be used to sense either the presence or absence of liquids. The capacitance type sensors are easy to install and adjust. A capacitor plate is built into the end of the sensor and is frequently powered by a high frequency oscillator. When a liquid approaches the capacitor plate that is built into the end of the sensor, the frequency changes and is sensed by the solid state detection circuitry. The frequency chance causes an electronic switch to actuate and to be sent to a main controller that reads the level of the liquid in the buffer tank.

As shown in FIG. 1, when the low liquid level sensor 34 senses a liquid level inside the buffer tank 20, the sensor 34 sends out a signal to the main controller indicating that the buffer tank 20 is ready for accepting spent processing liquid from the drain box 12. The signal sent out by the low liquid level sensor 34 therefore activates the pump 18 and opens valves 22 and 14 such that the spent processing liquid can be drained away from the drain box 12. As the buffer tank 20 is gradually filled up by the spent processing liquid, the high liquid level sensor 32, senses a liquid level which starts the pump 38 and the flow control valve 36 such that the spent processing liquid in the buffer tank 20 is transported through conduit 42, 44 and 46 into one of the waste collection tanks 52~58 through conduit 62~68. Note that the waste collection tanks 52~58 are also marked as tank A~D in FIG. 1. At the start of a process, all four waste collection tanks 52~58 are empty and therefore the main controller determines the priority sequence from A~D such that the first waste collection tank 52 (or A) receives the spent processing liquid 70. As the spent processing liquid, such as spent photoresist liquid, is pumped away from the buffer tank 20, the liquid level in the buffer tank 20 goes down while the pump 38 continues to pump away the spent processing liquid 70 into the waste collection tank 52. This continues until the low level sensor 34 on the buffer tank 20 redetects a liquid level and sends a signal to the main controller such that the pump 38 is stopped. This action repeats itself until the first waste collection tank 52 is completely full.

A liquid level sensor (not shown) mounted on the first waste collection tank 52 sends out a signal to the main controller when it senses a high liquid level in the tank 52. The main controller then sends out a signal to control the magnetically controlled flow control valve 72 and opens the flow control valve 74 to allow the spent processing liquid to enter the second waste collection tank 54. This process continues until the third waste collection tank 56 is filled up and the fourth waste collection tank 58 is in use, the signal from the flow control valve 76 when closed by the main controller activates an alarm to alert a maintenance worker to empty the waste collection tanks 52, 54 and 56 such that when waste collection tank 58 is filled up, the main controller receives a signal from the liquid sensing device (not shown) and then close valve 78 and reopens valve 72 such that the emptied first waste collection tank 52 can be filled again.

It should be noted that in a normal semiconductor fabrication plant lay out, the process machine is normally situated on a higher floor, while the drain box 30 is located at a lower floor. This is arranged both from a safety point of view such that machine operator is away from the hazardous drain material and from a processing point of view since gravity further helps the transporting of the spent processing liquid from the drain box 12 to the buffer tank 20. The waste collection tanks are normally situated further away from the drain box 30 in a more remote area that is set aside specifically for waste chemical treatment. This further improves the safety handling of hazardous chemicals in a semiconductor fabrication plant and segregate the plant personnel from the hazardous materials. As an added safety feature, a leakage detector or sensor is further utilized by installing the leakage sensor in the facility of the drain box and the waste collection tanks. The output signal from the leakage sensor is fed directly to the main controller such that maintenance personnel can detect any leakage of the spent processing liquid outside the buffer tank or the collection tank when it occurs.

Figure 2:
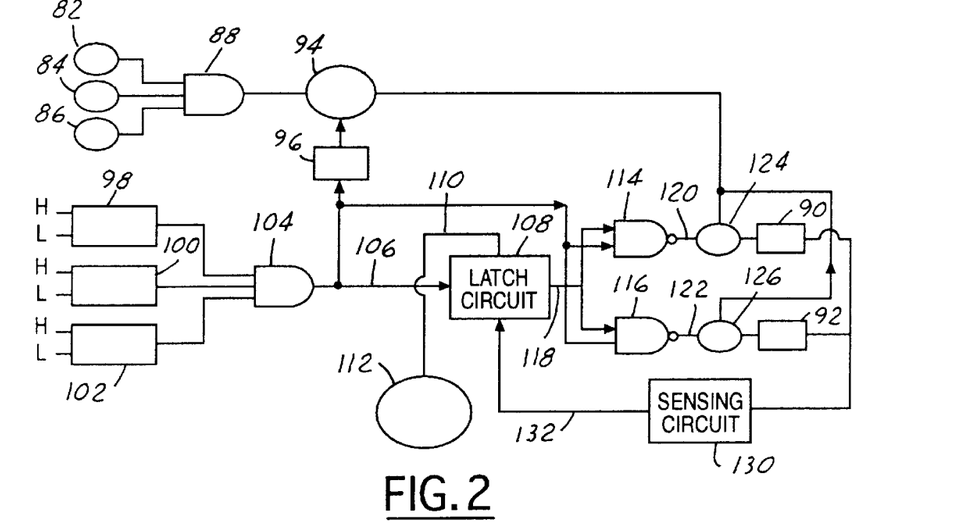
FIG. 2 is a logic diagram illustrating the present invention automated processing liquid drain system.

Referring now to FIG. 2 wherein a logic diagram illustrating the present invention automated processing liquid drain system of FIG. 1 is shown. It should be noted that only three separate processing machines, each utilizing a polyimide, a TEL/M7 and a SVG 90, are used in this illustration. Three flow control valves 82, 84 and 86 for the three separate process machine drain boxes and an AND gate 88 are used to control the flow of the spent processing liquid into two waste collection tanks 90 and 92 through a pump 94 and an actuator 96. Liquid level detectors 98, 100 and 102 are each mounted to a processing liquid drain tank for the polyimide, TEL/M7 and SVG 90. Each of the liquid level sensors includes a high liquid level sensor and a low liquid level sensor. The outputs of the three liquid sensors 98~102 are fed into AND gate 104 and the output 106 is fed into a latch or selecting circuit 108. An output 110 from the latch circuit is fed to an alarm 112 when the high liquid level sensors sense a high liquid level in the tanks. NAND gates 114 and 116 also receive an output 118 from the latch circuit 108. The output 120 and 122 from the NAND gates 114 and 116 are used to control flow control valves 124 and 126 for the waste collection tanks 90 and 92. The liquid level in the waste collection tanks 90 and 92 are detected and sent to a sensing circuit 130 producing an output 132 for feeding back to the latch circuit 108. It should be noted that while only two waste collection tanks 90 and 92 are illustrated in FIG. 2 for simplicity reasons, any number of waste collection tanks, such as four shown in FIG. 1, can be utilized in the present invention automated processing liquid drain system. It should also be noted that while three processing machines for polyimide, TEL/M7 and SVG 90 are illustrated in FIG. 2, as many as 16 processing machines can be controlled simultaneously by the present invention apparatus.

Figure 3:
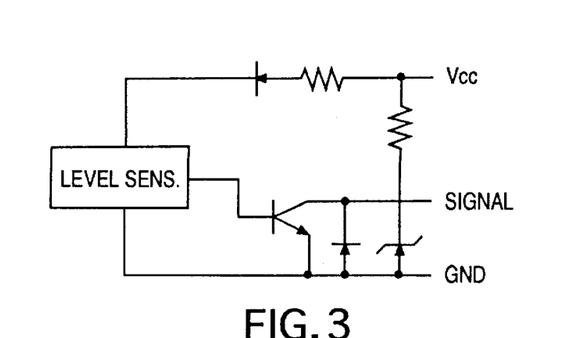
FIG. 3 is a circuit diagram for the liquid level sensor mounted on the second liquid collection tank.

FIG. 3 illustrates a circuit diagram for the liquid level sensors mounted on the liquid collection tanks. As shown in FIG. 3, the liquid level detection circuit produces a signal for sending to the control circuit for the pump and the valve and to activate such component when a liquid level is detected by the level sensors.

Figure 4:
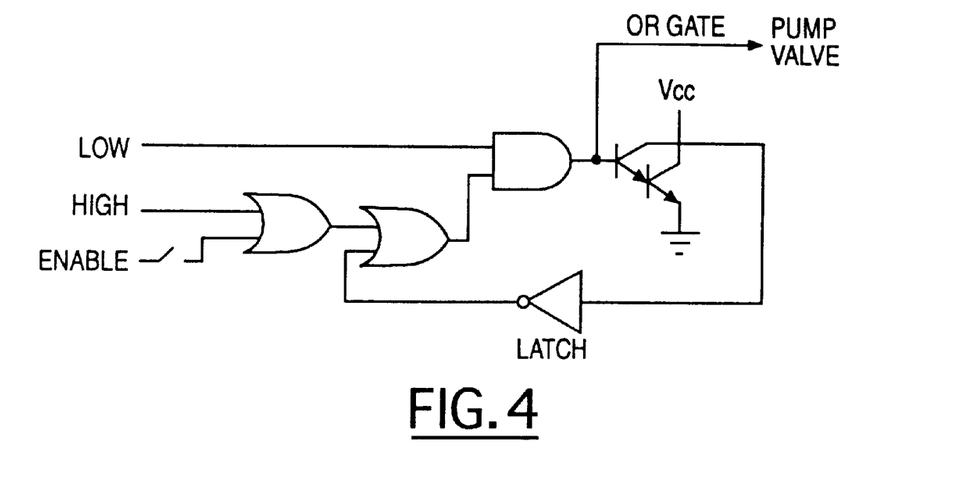
FIG. 4 is a circuit diagram for the control circuit, the pump and the valve for the second liquid collection tank.

FIG. 4 is a circuit diagram illustrating the control circuit of the pump and the valve for the liquid collection tanks. As shown in FIG. 4, the drive circuit functions when a high level signal and a low level signal are sensed simultaneously for sending out a signal to open the valve and to start the pump.

Figure 5:
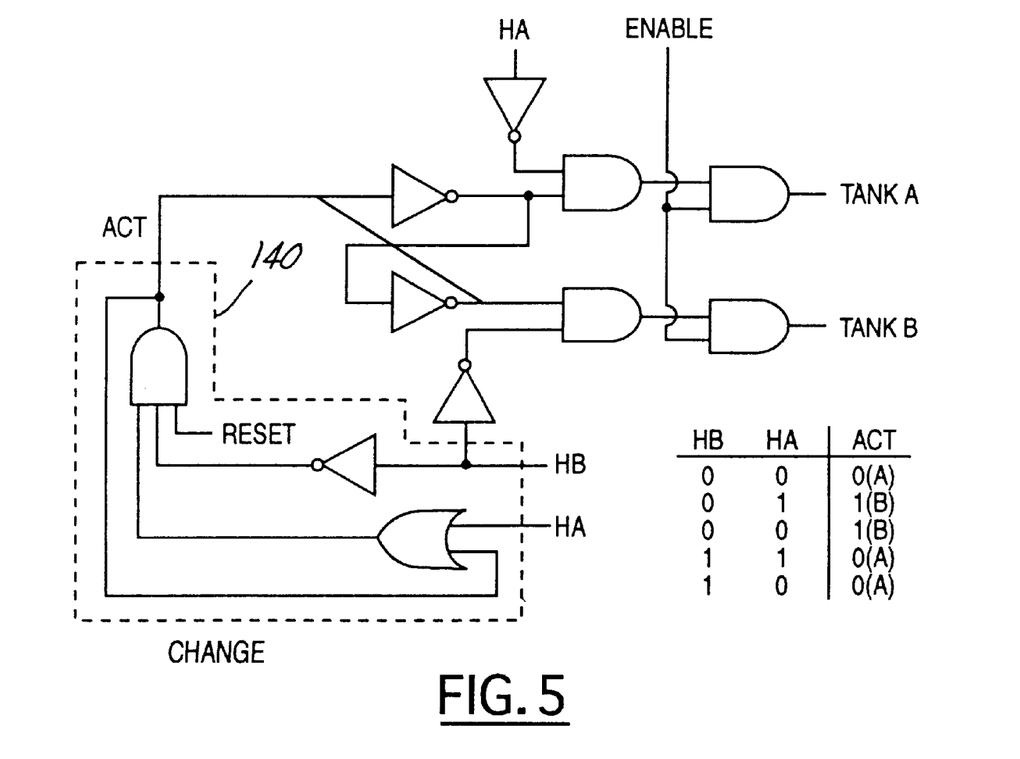
FIG. 5 is the circuit diagram for the latching or selection circuit.

FIG. 5 is a circuit diagram illustrating the latching circuit used in the present invention novel drain system. The latching circuit utilizes a latching method (a RS inverter) to latch the signal and to utilize circuit 140 to control the signals 0 and 1. When HB is 0 and HA is 0, ACT is 0 and then valve A is activated. When HB is 0, HA changes to 1, ACT is 1 then valve B is activated. When HB is 0, HA changes to 0 again, ACT is 1 then valve B is still activated. When HB is 1, and HA is 1, or when HB is 1 and HA is 0, ACT is 0 and then valve A is activated. As long as a signal of HA or HB is generated, an ALARM is produced. The RESET function is to provide an initial set value (tank A) after a power break.

The operation of a two tank (tank A and tank B) system can be illustrated as follows, when tank A—DRAIN FULL, then RA SWITCH is changed into a replacement mode, this is when the red light indicator on tank A is lit up, the level sensor on tank A is then removed, a feed tube is also removed from tank A. A new tank is used to replace tank A and fasten in place. The feed tube is then replaced into the empty tank and the liquid level detector is again mounted to the empty tank A. The RA SWITCH is then switched over to USE and thus the tank replacement is completed. When tank B is full, a similar procedure can be executed to replace an empty new tank B by first switching RB SWITCH into replacement mode and then switching into use mode.

Figure 6:
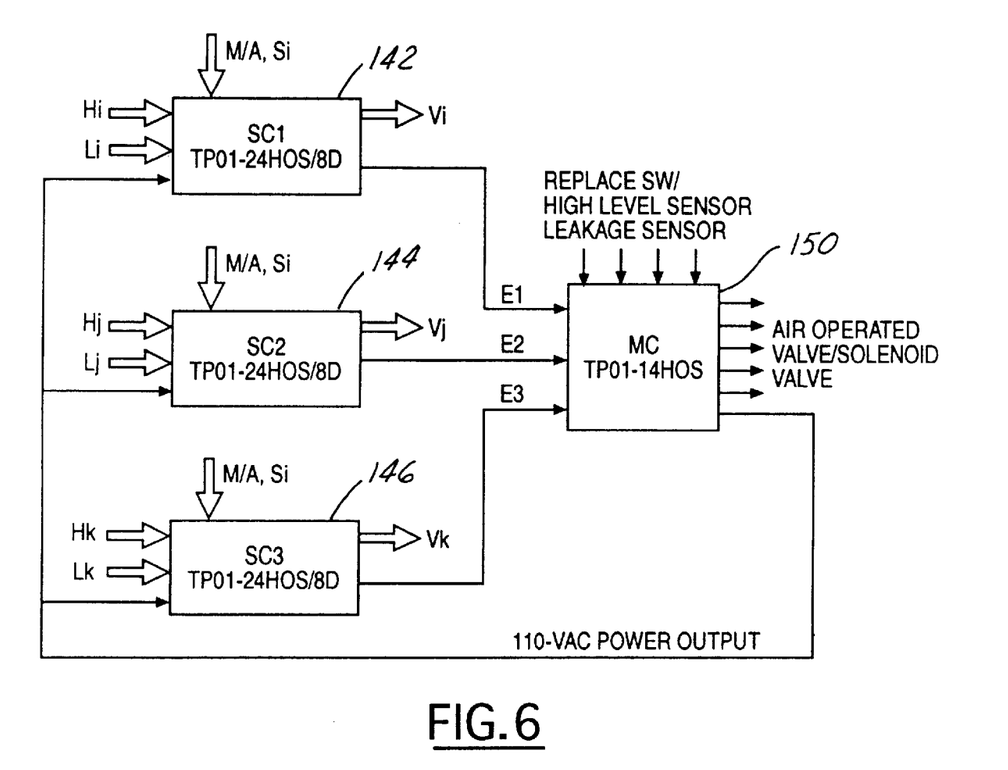
FIG. 6 is a control block diagram illustrating the sub-controllers and the main controller.

FIG. 6 is a control block diagram illustrating the main controller and the sub-controllers utilized in the present invention novel drain control system. The sub-controllers 142, 144 and 146 are each utilized to detect the condition of the drain tanks. The sub-controller controls the flow control valve attached to each of the drain tanks 142~146 and furthermore, sends out enabling signal to the main controller 150. The level sensors (not shown) on each drain tank is used to control the electromagnetically controlled flow valves on the drain box. When the high liquid level sensor is turned on the drain tank, the electromagnetically controlled flow valve is opened to allow spent processing liquid to flow through. Simultaneously, an enabling signal is sent to the main controller 150.

The main controller 150 has the major function of detecting the conditions of four waste collection tanks (not shown), i.e., the conditions of full, replace, leakage. The main controller further controls the electromagnetically controlled flow switches to the pump and to the four waste collection tanks. Another major function for the main controller is the reporting of the status of the four waste collection tanks to a central control station in the fab plant to provide 110 VAC to the various sub-controllers. The main controller further utilizes the enabling signals received from the sub-controllers 142~146 and the signals received from the four waste collection tanks to determine whether to start the pump and open the flow control valves to the four tanks.

Figure 7:
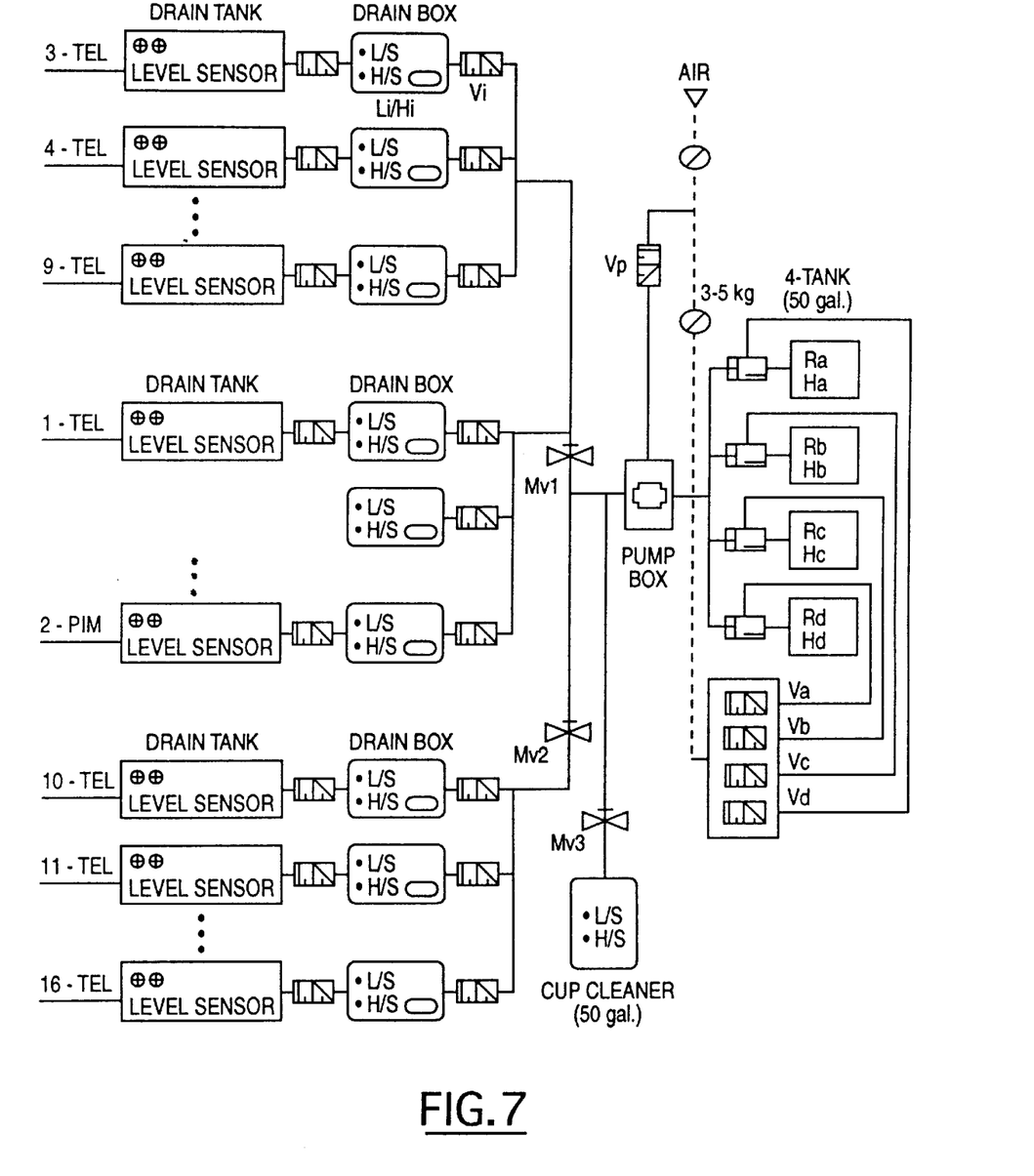
FIG. 7 is a diagram illustrating the conveying type connections.
Figure 8:
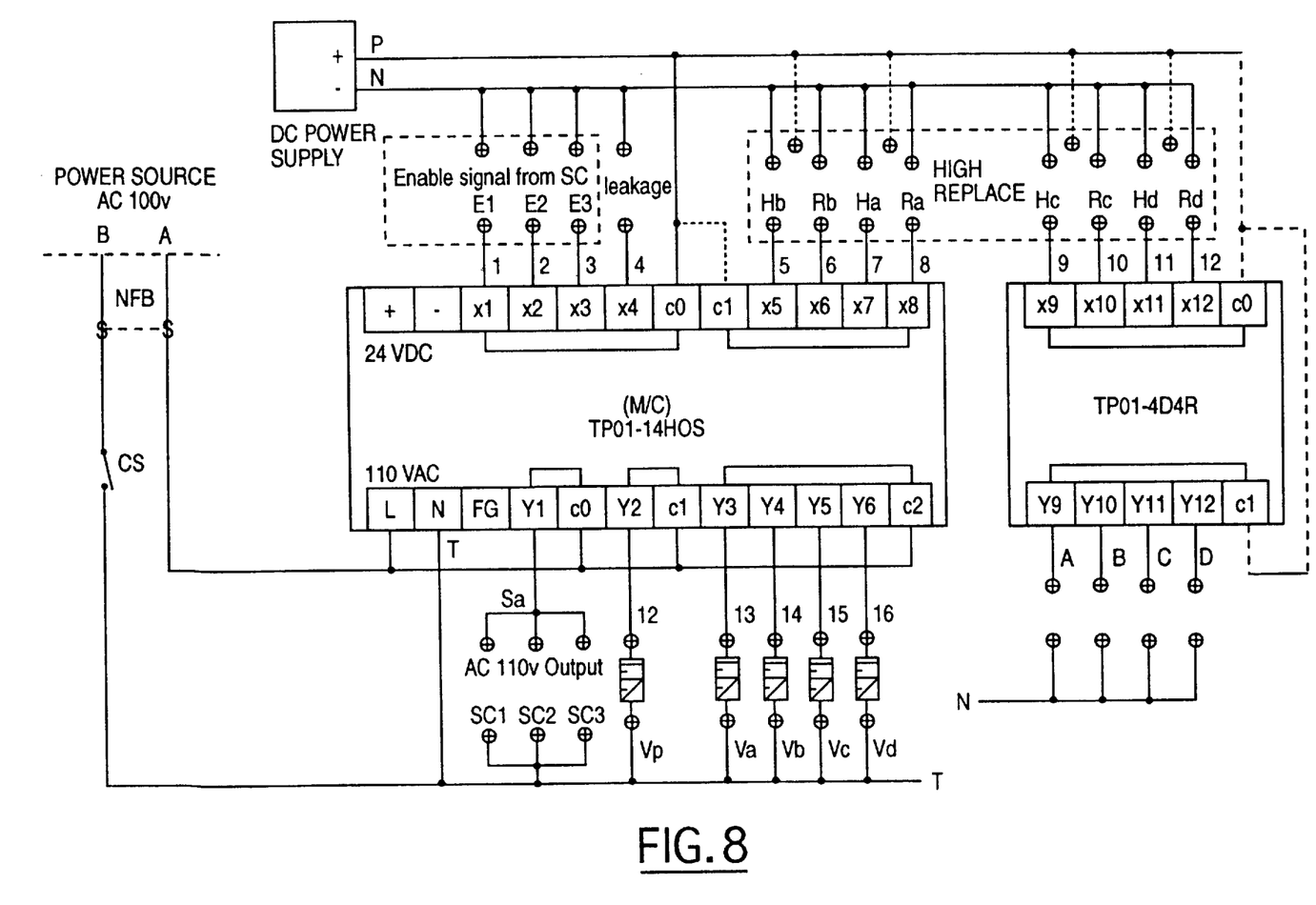
FIG. 8 is a circuit diagram for the main controller connections.
Figure 9:
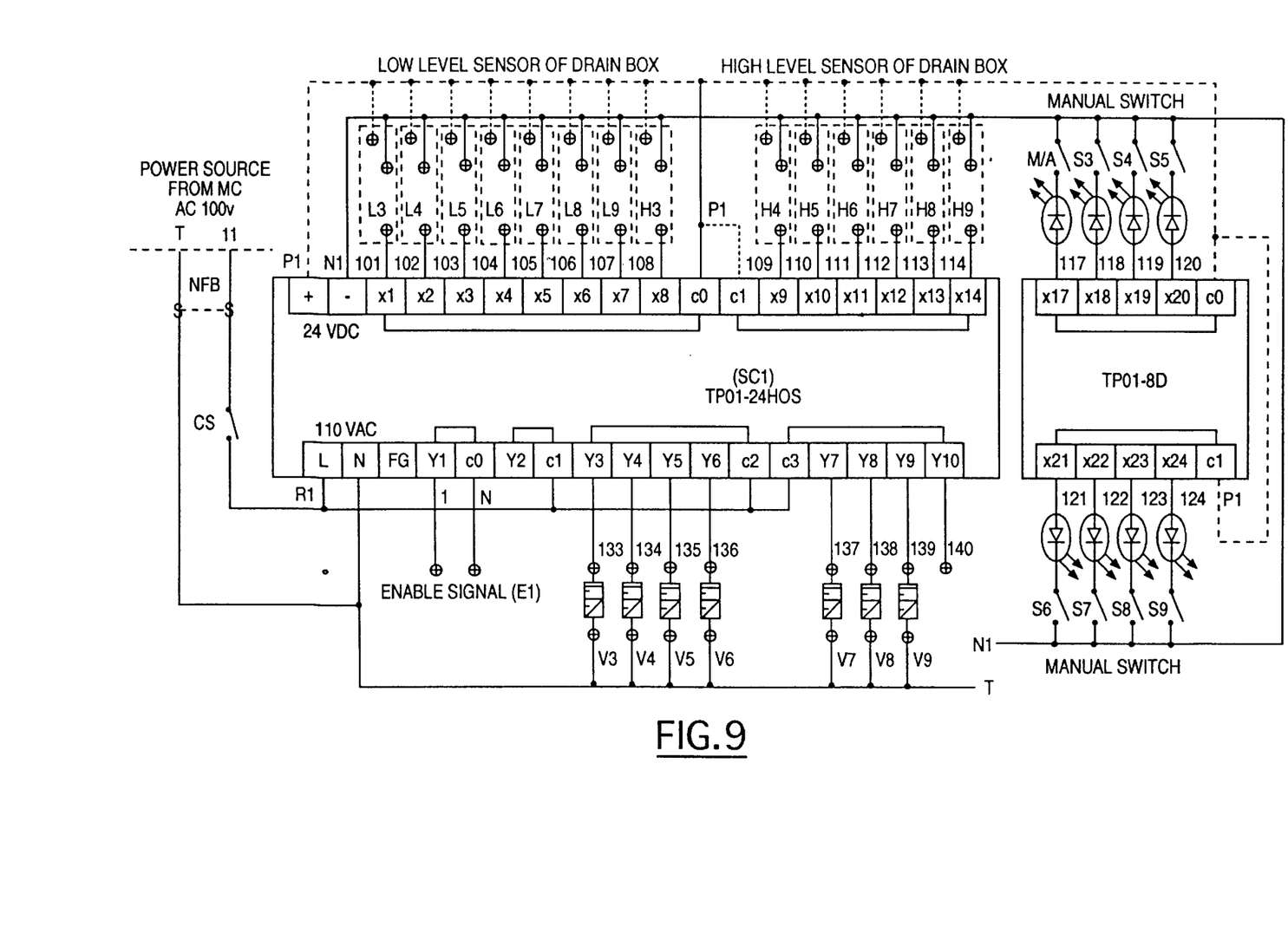
FIG. 9 is a circuit diagram illustrating the first sub-controller connections.

In an example of the present invention novel system, a 55 gallon tank each equipped with a high level sensor is used as the waste collection tanks. Each of the tanks is further equipped with a replace switch, a leakage sensor and a set of air operated valve/solenoid valve. The level sensor detects a high liquid level in the 50 gal. tank and the replace switch replaces a manual switch on the tank. The air operated valve is used to control the flow of spent processing liquid into the tank while the solenoid valve is used to control the amount of air needed by the air operated valves. The four waste collection tanks can be switched over automatically by the main controller from one to another with the priority sequence of A, B, C and D. A diagram illustrating the pipe connections for the four waste collection tank system described above is shown in FIG. 7. A circuit diagram for the connections on the main controller and on the first sub-controller are illustrated in FIGS. 8 and 9, respectively. FIGS. 7~9 are self explanatory which illustrate the present invention novel drain control system utilizing four waste collection tanks. Signal look-up Tables for FIGS. 8 and 9 are shown in Tables 1 and 2 respectively. The other sub-controller systems for sub-controller 2 and sub-controller 3 are similar to sub-controller 1 and therefore, are not shown.

TABLE 1

| Input | Description | Output | Description |
|---|---|---|---|
| x1 | Enabling Signal To SC1 (E1) | y1 | Control 110 vac power for SC |
| x2 | Enabling Signal to SC2 (E2) | y2 | Control Pump Flow Valve (Vp) |
| x3 | Enabling Signal to SC3 (E3) | y3 | Control A Tank Flow Valve (Va) |
| x4 | Leakage Sensor (4 leakage sensor or signal) | y4 | Control B Tank Flow Valve (Vb) |
| x5 | B Tank High Level Signal (Hb) | y5 | Control C Tank Flow Valve (Vc) |
| x6 | B Tank Replace Signal (Rb) | y6 | Control D Tank Flow (Vd) |
| x7 | A Tank High Level Signal | y9 | A Tank Full |
| x8 | A Tank Replace (Ra) | y10 | B Tank Full |
| x9 | C Tank High Level (Hc) | y11 | C Tank Full |
| x10 | C Tank Replace (Rc) | y12 | D Tank Full |
| x11 | D Tank High Level (Hd) | | Signal to Fab Control: |
| x12 | D Tank Replace (Rd) | | |

TABLE 2

| Input | Description | Input | Description |
|---|---|---|---|
| x1 | 3-TEL low level signal (L3) | x12 | 7-TEL high level signal (H7) |
| x2 | 4-TEL low leyel (L4) | x13 | 8-TEL high level (H8) |
| x3 | 5-TEL low level (L5) | x14 | 9-TEL high level (H9) |
| x4 | 6-TEL low level (L6) | x17 | Manual/Auto Mode Switch |
| x5 | 7-TEL low level (L7) | x18 | Manual Switch: 3-TEL (S3) |
| x6 | 8-TEL low level (L8) | x19 | Manual Switch: 4-TEL (S4) |
| x7 | 9-TEL low level (L9) | x20 | Manual Switch: 5-TEL (S5) |
| x8 | 3-TEL high level (H3) | x21 | Manual Switch: 6-TEL (S6) |
| x9 | 4-TEL high level (H4) | x22 | Manual Switch: 7-TEL (S7) |
| x10 | 5-TEL high level (H5) | x23 | Manual Switch: 8-TEL (S8) |
| x11 | 6-TEL high level (H6) | x24 | Manual Switch: 9-TEL (S9) |
| Output | Description | Output | Description |
| y1 | Enabling Signal to MC (E1) | y6 | 6-TEL control valve (V6) |
| y2 | not used | y7 | 7-TEL (V7) |
| y3 | Valve for Controlling 3-TEL (V3) | y8 | 8-TEL (V8) |
| y4 | Valve for Controlling 4-TEL (V4) | y9 | 9-TEL (V9) |
| y5 | Valve for Controlling 5-TEL (V5) | y10 | not used |

While the present invention has been described in an illustrative manner, it should be understood that the terminology used is intended to be in a nature of words of description rather than of limitation.

Furthermore, while the present invention has been described in terms of a preferred embodiment, it is to be appreciated that those skilled in the art will readily apply these teachings to other possible variations of the inventions.

The embodiment of the invention in which an exclusive property or privilege is claimed are defined as follows:

1. A processing liquid drain system comprising:

a first processing liquid drain tank positioned in close proximity to a process machine for collecting spent processing liquid, a second processing liquid drain tank in fluid communication with and situated below said first processing liquid drain tank by a first conveying means, said second processing liquid drain tank is equipped with at least one high liquid level sensing means for triggering by said spent processing liquid and for flowing said spent processing liquid through a second conveying means into a waste collection tank, and at least two waste collection tanks in fluid communication with said second processing drain tank by said second conveying means for accepting said spent processing liquid from said second processing liquid drain tank when said at least one high level sensing means is triggered.

2. A system according to claim 1, wherein said at least one liquid level sensing means comprises a high liquid level sensing means and a low liquid level sensing means.

3. A system according to claim 1, wherein said second processing liquid drain tank is positioned at a floor level below said first processing liquid drain tank.

4. A system according to claim 1, wherein said at least two waste collection tanks each equipped with a liquid level sensor and valve means for detecting a full/empty status, said at least two waste collection tanks in fluid communication with said second processing liquid drain tank are connected in such a way that when a first tank of said at least two waste collection tanks is full, said liquid level sensor sends out a signal to a main controller which then sends a signal to close a flow control valve to said first tank and to open a flow control valve to a second tank for collecting said spent processing liquid.

5. A system according to claim 1, wherein said at least one liquid level sensing means is of the static capacitance type.

6. A system according to claim 1, wherein said first conveying means comprises a pump and at least one valve.

7. A system according to claim 1, wherein said second conveying means comprises a pump and at least one valve.

8. A system according to claim 1, wherein said first conveying means comprises a pump, a valve between said first processing liquid drain tank and said pump, and a valve between said pump and said second processing liquid drain tank.

9. A system according to claim 1, wherein said second conveying means comprises a pump, a valve between said second processing liquid drain tank and said pump, and a valve between said pump and said at least two waste collection tanks.

10. A system according to claim 1, wherein said at least two waste collection tanks each equipped with a liquid level sensor and valve means for detecting a full/empty status, said at least two waste collection tanks comprises four waste collection tanks controlled by a master controller capable of monitoring the full/empty status of said four waste collection tanks by inputting signals from said liquid level sensor mounted on each of said four tanks.

11. An automated processing liquid drain system comprising:
  a first liquid holding tank positioned in close proximity to a process machine for collecting spent processing liquid from the machine,
  a second liquid holding tank in fluid communication with said first liquid holding tank and is equipped with a high liquid level sensor and a low liquid level sensor for triggering by said spent processing liquid, and
  a first pump means in fluid communication with and positioned inbetween said second liquid holding tank and said at least one waste collection tank for delivering said spent processing liquid from said second liquid holding tank to said at least one waste collection tank when a high liquid level is said second liquid holding tank is detected by said high liquid level sensor and said first pump means is activated.

12. An automated system according to claim 11 further comprising a master controller for receiving a signal from said high liquid level sensor when a high liquid level in said second liquid holding tank is detected such that the master controller opens a valve connected between said second liquid holding tank and said at least one waste collection tank to allow a volume of spent processing liquid to flow to said at least one waste collection tank.

13. An automated system according to claim 11, wherein said first liquid holding tank further comprises a high liquid level sensor for sensing a high liquid level in said tank and sending out a warning signal.

14. An automated system according to claim 11, wherein said second liquid holding tank is positioned at a level below said first liquid holding tank to further facilitate the transfer of spent processing liquid by gravity.

15. An automated system according to claim 11, wherein said at least one waste collection tank is equipped with a high liquid level sensor for sensing a high liquid level in said tank and sending a signal to a master controller for either sounding an alarm or closing a valve connected in between said second liquid holding tank and said at least one waste collection tank.

16. An automated system according to claim 11, wherein said at least one waste collection tank comprises a first and a second waste collection tank each equipped with a high liquid level sensor such that when a high liquid level is detected in the first tank and a signal is sent to a master controller, the controller closes a valve to the first tank and opens a valve to the second tank to accept the spent processing liquid from said second liquid holding tank.

17. An automated system according to claim 11, wherein said first pump means and said second pump means further comprises a plurality of valve means for opening and closing passageways between said first and second liquid holding tanks and between said second liquid holding tank and said at least one waste collection tank.

18. A method for draining spent processing liquid from a process machine comprising the steps of:
  collecting spent processing liquid into a first holding tank positioned in close proximity to the process machine,
  flowing the spent processing liquid from said first holding tank into a second holding tank positioned at a level lower than said first holding tank through a first conduit, said second holding tank being equipped with a high liquid level sensor for detecting a fluid level of said spent processing liquid,
  connecting said second holding tank in fluid communication to at least one waste collection tank through a pump and a valve, and
  flowing said spent processing liquid to said at least one waste collection tank through a second conduit when a high liquid level of said spent processing liquid is detected by said high liquid level sensor.

19. A method according to claim 18 further comprising the step of equipping said second holding tank with a low liquid level sensor and shutting off said pump and valve between the second holding tank and the at least one waste collection tank when a low liquid level is detected by the sensor.

20. A method according to claim 18, wherein said at least one waste collection tank each equipped with a liquid level sensor and valve means for detecting a full/empty status, said at least one waste collection tank comprises a first and second tank such that when the first tank is full as detected by said liquid level sensor, the second conduit switches over to the second waste collection tank for collecting the spent processing liquid.

* * * * *